May 30, 1944.  M. R. OLSEN ET AL  2,349,830
WATER TREATING DEVICE
Filed March 22, 1940  2 Sheets-Sheet 2
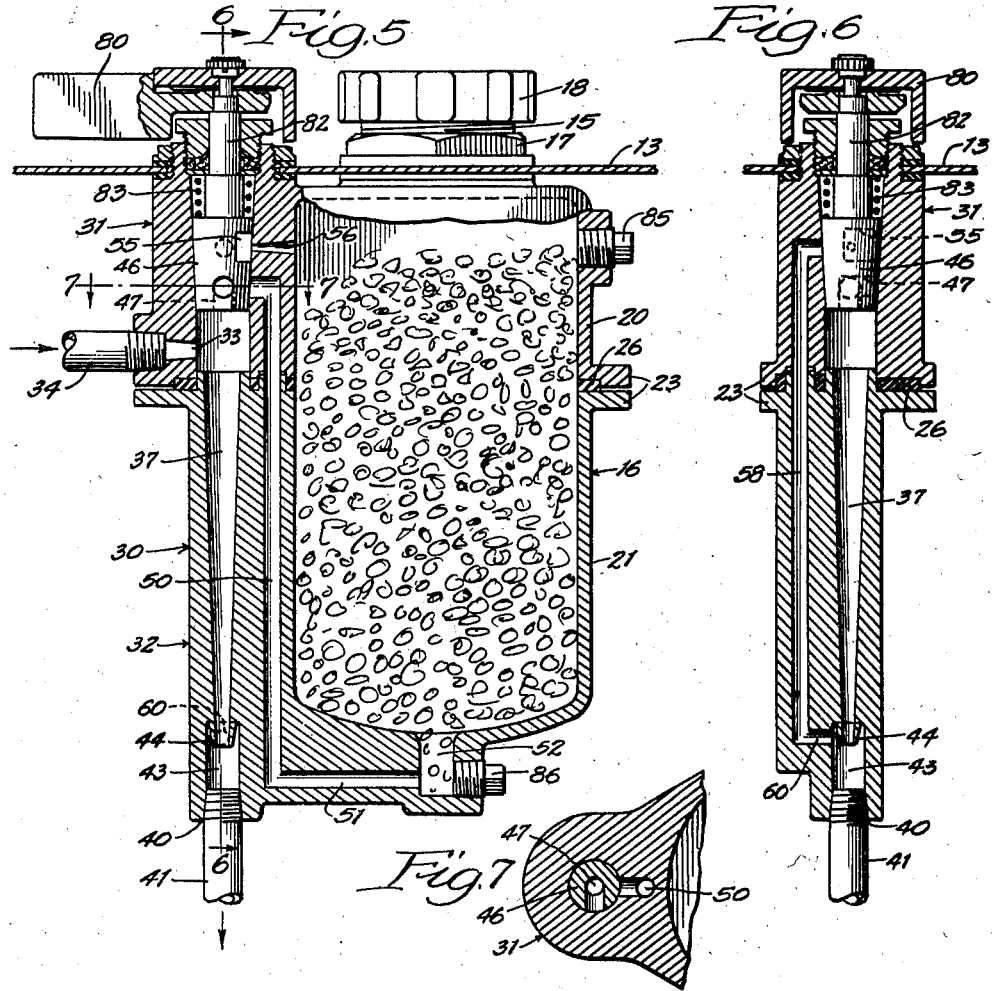
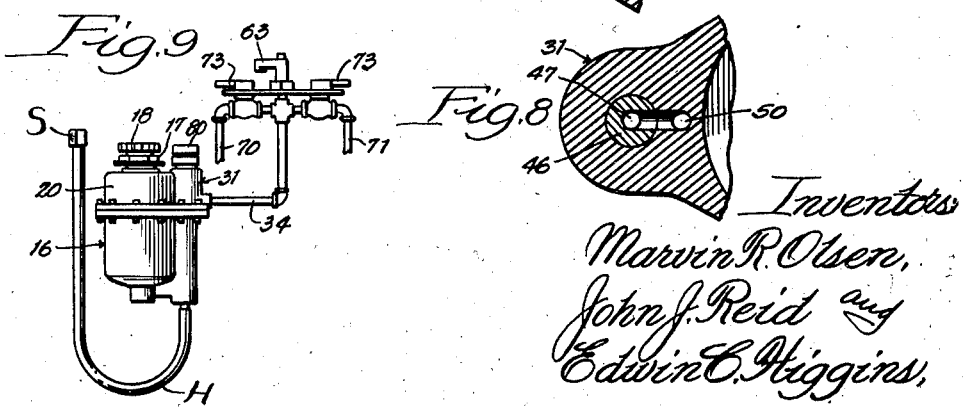
Inventors
Marvin R. Olsen,
John J. Reid and
Edwin C. Higgins,
By Frank H. Marks
Attorney Patented May 30, 1944

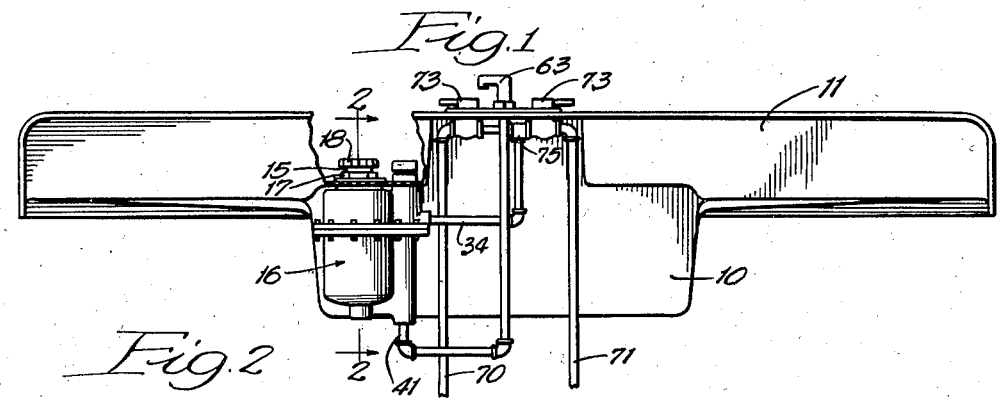
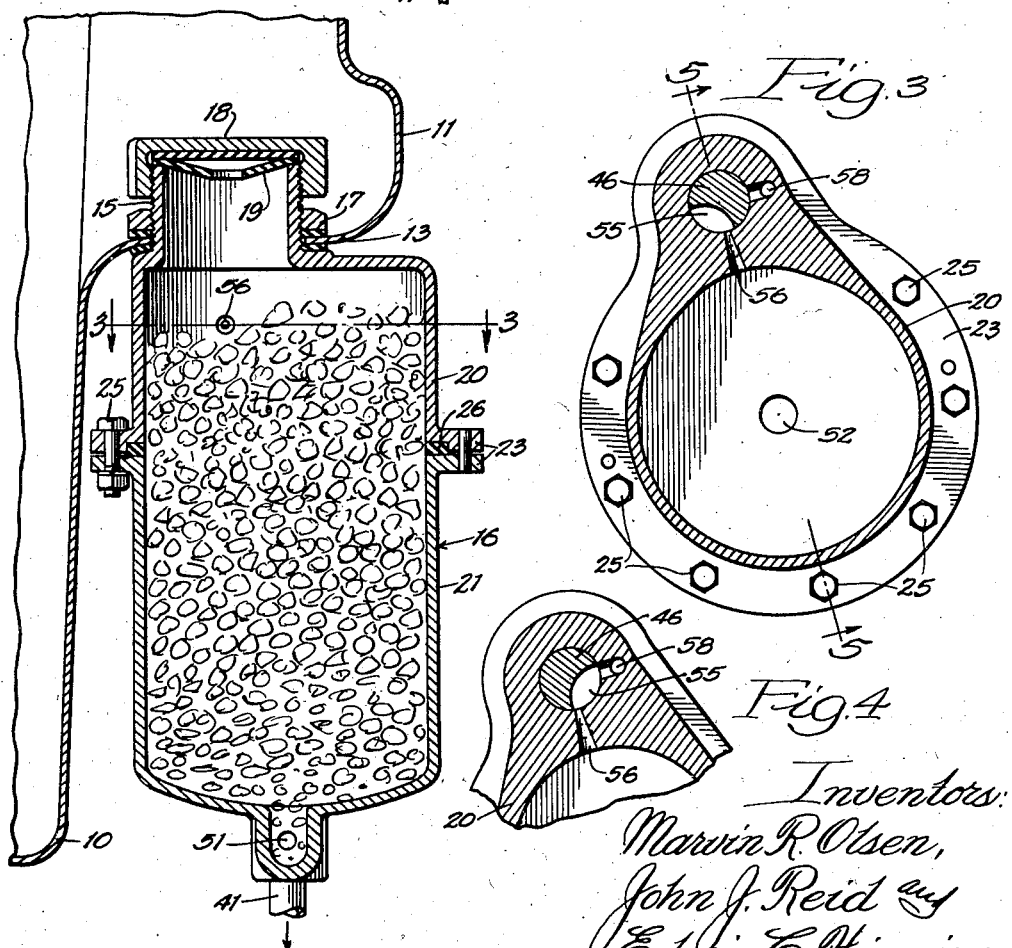

2,349,830

UNITED STATES PATENT OFFICE 2,349,830

WATER TREATING DEVICE

Marvin R. Olsen, Glen Ellyn, John J. Reid, Elmhurst, and Edwin C. Higgins, Chicago, Ill., assignors to Sears, Roebuck and Co., Chicago, Ill., a corporation of New York Application March 22, 1940, Serial No. 325,346

6 Claims. (Cl. 210—38)

Our invention relates broadly to water-treating devices used in connection with a plumbing system. More particularly, our invention has to do with a device which is attachable to a water conduit and adapted to treat, with a chemical substance, portions of the water conveyed by said conduit. Said substance may be of various types; for example, it may be a soap, a water-softening material, bath salts, etc., etc.

A particular object of our invention is to provide a container for a chemical material designed for the treatment of water, with means attachable to a water main and adapted to pass a variable proportion of the water conveyed in the main through said container and for returning the water which has been passed through said container back into the main.

Another object is to provide, in a device of the type referred to, an improved valve mechanism which is simple in design, economical to construct and certain in operation.

Still another object is to provide a device of the type referred to in combination with a sink, basin, tub, or the like, the container and associated parts, except for a filling opening thereof, being substantially concealed, while the valve control element is readily accessible.

Another object is to provide a device of the type referred to wherein the container and associated parts are especially designed to permit convenient flushing out of the container for cleansing purposes.

Another object is to provide a combination of the type referred to which is thoroughly satisfactory for the purposes desired.

Various other objects and advantages will doubtless suggest themselves to those skilled in the art as the description proceeds.

Referring now to the drawings forming a part of this specification and illustrating a preferred embodiment of our invention:

Fig. 1 is an elevational view showing an improved water-treating plumbing accessory embodying our invention, attached to a water main in association with a sink, the latter being shown in rear elevation with a portion cut away, together with associated plumbing;

Fig. 2 is a sectional view on an enlarged scale taken substantially along the line 2—2 of Fig. 1;

Fig. 3 is a similar view taken substantially along the line 3—3 of Fig. 2;

Fig. 4 is a fragmentary sectional view showing a portion similar to Fig. 3 but with the valve in a different position;

Fig. 5 is a sectional view taken substantially along the line 5—5 of Fig. 3;

Figs. 6 and 7 are sectional views taken substantially along the lines 6—6 and 7—7, respectively, of Fig. 5;

Fig. 8 is a view similar to Fig. 7, but with the valve in a different position; and Fig. 9 is an elevation showing an alternative hookup.

The numeral 10 represents the sump of a sink having a rear splash panel 11. Between the sump 10 and the splash panel 11 is a substantially horizontal ledge 13 provided with an opening through which extends a neck portion 15 of a container structure represented generally by the numeral 16, disposed behind the vertical wall of the sink. The neck 15 may be exteriorly threaded, as shown in Fig. 2, whereby it may be clamped to the sink as by the nut 17, suitable gaskets being provided, as shown. The neck is provided with a closure cap 18, a suitable gasket 19 being interposed for providing a tight seal.

It will be understood that, although we have shown our improved plumbing accessory in connection with a kitchen sink, this is merely by way of example, since our invention is equally applicable to wash basins, bathtubs, bath showers, and in various other relations in a plumbing system where water treatment is desired.

The container 16 preferably is formed in two parts clamped together. It comprises an upper portion 20 and a lower portion 21, said portions having abutting annular flanges 23 whereby the parts may be secured together, as by bolts extending through apertures in the flanges, a suitable annular gasket 26 being disposed between the two flanges, thus forming a chamber for water treating material.

Preferably cast integrally with the respective parts 20 and 21 of the container structure 16 is a main conduit and by-pass system indicated generally by the numeral 30. This system comprises a part 31 which is preferably integral with the part 20 and a part 32 preferably integral with the part 21. The part 31 has an opening 33 threaded to receive an inlet conduit 34. The opening 33 communicates with a passage 37 which extends through parts 31 and 32, said passage terminating in a threaded opening 40 to which is connected an outlet conduit 41. In the passage 37 is an enlarged chamber 43, a nozzle-like element 44 extending into the chamber 43 so as to produce a Venturi effect, in a manner which will become apparent as the description proceeds.

Arranged in part 31 in the passage 37 is a conical valve member 46. Said valve member has a pair of independent passages therein, one of said passages 47 being L-shaped and adapted to communicate in one position of the valve, with the longitudinal passage 37 and also with a passage 50 which extends substantially parallel to the passage 37 and then diverges therefrom, as indicated at 51, communicating with the bottom of the container, as at 52. The other passage 55 of the valve member is adapted to communicate with a passage 56 leading from the container and also communicates with a passage 58 which extends substantially parallel to the passages 37 and 50, then diverging so as to enter the chamber 43, as indicated at 60. A spout for discharging liquid from the pipe 41 is shown at 63.

The numerals 70 and 71 represent the usual hot and cold water pipes, each having a suitable valve 73 with other appropriate fittings, the two streams commingling in a union 75.

The valve 46 is controlled by a suitable manipulating member, such as a handle 80 attached to a valve stem 82, a coil spring 83 about the stem retaining the valve in its seat.

Screw plugs 85 and 86 may be provided for threaded openings in the container 16 for access of tools for cleaning passages 56 and 51, respectively, the lower opening also facilitating draining of the container.

In the operation of the device, the container 16 is charged with the material with which it is desired to treat the water. Such material might be soap powder, a water softening agent, bath salts, etc. The container is then securely closed with the cap 18. The main stream of water flows through the conduit 34, the passage 37 and pipe 41, whence it flows to the spout 63 or, in lieu thereof, a spray head or other suitable outlet device. It will be understood that when the valve is in the position shown in Figs. 3, 5 and 7, the entire flow of water passes in the manner just described, no portion thereof being subjected to treatment.

When it is desired to treat a portion of the water, the valve is turned in such manner that the port 47 registers with the passage 50, as shown in Fig. 8. Obviously, the valve may be adjusted so as to permit more or less water to be by-passed through the passage 50. Such by-passed water will enter the container through its inlet opening 52, flowing upwardly through the container and out through the passage 56, carrying out treating material dissolved or dispersed therein.

When the valve is open, as just described, and as illustrated in Figs. 4 and 8, the water which has flowed through the container and which has been treated by the chemical therein will pass out of the container through the outlet opening 56, thence flowing down through the passage 58 and into the chamber 43, there to be mixed with the main stream of water. (See Figs. 4, 5 and 6.)

It will be understood that the jetting action of the main stream through the Venturi nozzle 44 will serve to suck the by-passed liquid through the container, thus facilitating the flow of the by-passed liquid.

It will be apparent that the valve may be adjusted to close completely the container from the main flow of liquid, permitting one to obtain pure untreated water, or the valve may be adjusted so as to by-pass and treat a smaller or larger proportion of the water, as desired.

When it is desired to flush out the tank as, for example, before a new charge of water-treating material is to be placed in the tank, with the cocks 73 closed, the cap 18 is removed, leaving the container open to atmospheric pressure, the valve 46 is disposed in open condition so as to provide a continuous passage from the inside of the tank to the duct 37, and the outlet of the conduit 41 is disposed at a level below that of the passage 51. This may be accomplished very simply when a spray head attached to a flexible tube is substituted for the spout 63 or attached thereto and is movably mounted in the sink, so that the spray head may be moved down into the bottom of the sump 10. Otherwise, the same result may be accomplished merely by attaching a length of flexible tube to the spout 63 sufficient to reach the bottom of the sump. In any event, it will be seen that the container 16 will clear itself by ordinary siphonic action.

According to Fig. 9, the water-treating mechanism is the same as in the other embodiment but is hooked up somewhat differently in that instead of the treated water being conveyed to the spigot 63, as shown in Fig. 1, it is connected to a flexible hose H which has attached to its free end a spray nozzle S which may be arranged at any convenient place in the sink. The operation is the same as in the other embodiment, the only difference being that the operator may pick up the nozzle S and move it about in the sink to spray dishes or the like with treated water when water is diverted from the regular channels through the treating device.

Various modifications and variations coming within the spirit of our invention may suggest themselves to those skilled in the art and, hence, we do not wish to be restricted to the specific form shown or uses mentioned, except to the extent indicated in the appended claims.

We claim:

1. In combination with a sink having a substantially vertical wall and an adjoining horizontal wall, a container for water treating material having a filler neck at its upper end extending through said horizontal wall with the body of the container disposed behind and concealed by the vertical wall of the sink, means securing the container in said position, a removable closure for said filler neck, a water supply conduit connected into the container and an outlet conduit leading from said container to a position for discharge into the sink.

2. In combination with a sink having a substantially vertical wall and an adjoining horizontal wall, a container for water treating material having a filler neck at its upper end extending through said horizontal wall with the body of the container disposed behind and concealed by the vertical wall of the sink, said filler neck being threaded and a clamping nut fitted thereto securing the neck in the horizontal wall and supporting the container therefrom together with a water supply conduit connected into the container and an outlet leading therefrom to a position for discharge into the sink.

3. A water treating container which includes a chamber having an inlet in its lower portion, an outlet in its upper portion and an opening at the top of the chamber to receive a charge of water treating material, with a removable closure for said opening, an integral portion of the container wall providing a system of passages extending principally in a vertical direction therein, a first passage having an intake opening adapted for connection with a water main and having a discharge opening at its lower end adapted for connection with a delivery pipe, a second passage having connection with the first above said intake thereof and extending downwardly into connection with the container inlet, and a third passage connecting with the container outlet and extending downwardly into connection with the first passage at a point between the intake opening and the discharge opening thereof.

4. In a water treating container as defined in claim 3, a single valve disposed in the upper end portion of said first passage said valve providing the connection between the first passage and the second passage and the connection between the container and the third passage and being adjustable to a position at which it closes both connections.

5. In combination, a structure which includes a chamber having an inlet in its lower portion, an outlet in its upper portion and an opening at the top of the chamber to receive a charge of water treating material, a removable closure for said opening and means disposed laterally of the chamber providing a system of passages substantially within the height of said chamber, a first passage having an intake opening in its upper portion communicating with a water main and having a discharge opening in its lower portion, a second passage having connection with the first above the intake thereof and extending downwardly into connection with the chamber inlet and a third passage connecting with the chamber outlet and extending downwardly into constantly open connection with the first passage at a point down-stream from the connection of the second passage with the first together with a valve which provides the connection of the second passage with the first and also provides the connection between the chamber outlet and the third passage, said valve being disposed in the first passage above the intake opening thereof and being adjustable to a position at which it closes both of the connections provided as aforesaid whereby the flow of water is permitted from the intake through the first passage without any accompanying flow of water through the chamber.

6. In combination with a sink having a substantially vertical wall and an adjoining horizontal wall, a container for water treating material comprising a structure which includes a chamber having an inlet and an outlet, a passage having an intake opening communicating with a water main and having a discharge opening communicating with a delivery pipe, and a system of passages arranged to by-pass water from said passage to the inlet of said chamber and from the outlet thereof back into the passage, said chamber also having an opening at its upper end formed with a filler neck extending through said horizontal wall of the sink with the body of the container disposed behind and concealed by the vertical wall of the sink, means securing the container in said position, a removable closure for said filler neck, a valve having a body which is rotatively adjustable about a vertical axis and which controls the connection of the said passage with said system of passages said valve having a stem extending upwardly through said horizontal wall of the sink and an actuating handle on said stem accessible above said wall.

MARVIN R. OLSEN.
JOHN J. REID.
EDWIN C. HIGGINS.